Figure 1:
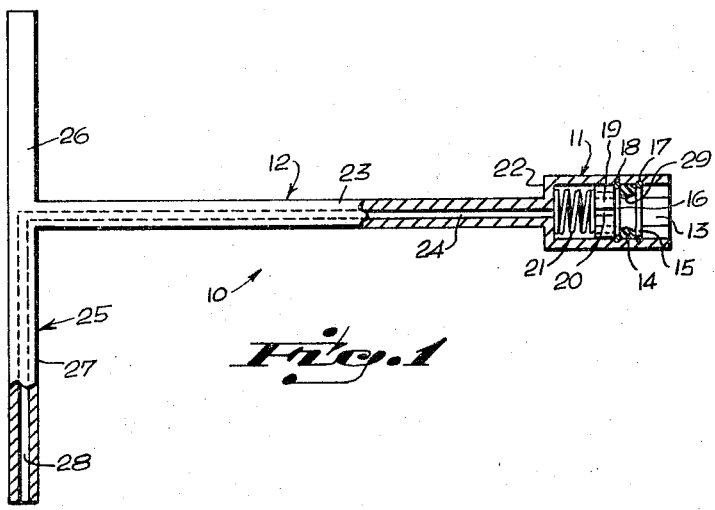

May 9, 1967 D. G. DOBBS 3,318,330
TOOL FOR BLEEDING HYDRAULIC BRAKES
Filed June 24, 1964

INVENTOR.
DONALD G. DOBBS
BY Ernest H. Schmidt
ATTORNEY.

United States Patent Office 3,318,330
Patented May 9, 1967

3,318,330
TOOL FOR BLEEDING HYDRAULIC BRAKES
Donald G. Dobbs, 4011 NW. 189th Terrace,
Carol City, Fla. 33054
Filed June 24, 1964, Ser. No. 377,726
7 Claims. (Cl. 137—614.2)

My invention relates generally to automobile mechanic's tools, and is directed particularly to improvements in tools for bleeding the hydraulic fluid lines of automotive hydraulic brakes.

Hydraulic brake systems for automotive vehicles comprise a master cylinder having a piston controlled by the brake pedal, a hydraulic cylinder at each wheel and controlling a piston connected to actuate a brake shoe, and a hydrualic fluid system including the master cylinder and wheel cylinders and fluid lines interconnecting the master cylinder and wheel cylinders for transmitting and evenly distributing, to the brake shoes, pressure applied to the brake pedal. For proper operation of such hydraulic systems, it is very important that no air be trapped in the hydraulic system. Otherwise, the compressibility of air in the fluid system renders the braking action of the foot pedal "springy," if not altogether inoperative. For this reason, whenever brake repair necessitates opening the hydraulic fluid lines at the master cylinder or a wheel cylinder, it becomes necessary to "bleed" the system, i.e., to cause hydraulic fluid to flow through the system in sufficient quantity to flush out any entrapped air. For this purpose bleeder valves are provided at each wheel cylinder, which can be opened one at a time while hydraulic fluid is pumped through the open valve by gradually applying pressure to the foot brake pedal. In such a bleeding operation great care must be taken to close the bleeder valve before pressure on the brake pedal is released, as its release ordinarily will create a reduced pressure in the line tending to draw air back in. It is therefore ordinarily necessary for two men to complete a bleeding operation, one to press upon the brake pedal to flush the line, and the other to close off the line at the wheel cylinder where being bled while the brake pedal is held in the depressed position. The need for two mechanics for such a simple operation is not only wasteful of labor, but inconvenient in that it prevents the mechanic working alone from completing a brake servicing job requiring bleeding until he has found an assistant.

It is accordingly the principal object of my invention to provide a tool for bleeding hydraulic brakes that obviates the need of two mechanics in bleeding hydraulic brake systems.

It is more particular object to provide a tool of the character described which comprises a socket wrench for opening a hydraulic line bleeder valve, combined with a check valve preventing the back flow of air in the valve opened, thereby eliminating the necessity of closing off the bleeder valve before release of the foot brake pedal.

Yet another object is to provide a tool of the above nature wherein the socket wrench is formed with an elongated T-shaped wrench handle drilled to provide a passageway for conveying fluid away from the vicinity of the cylinder being bled, so that testing for leakage under pressure can subsequently be more easily made.

Still another object is to provide a tool of the above nature which will be simple in structure, easy to use, and effective and durable in operation.

Figure 2:
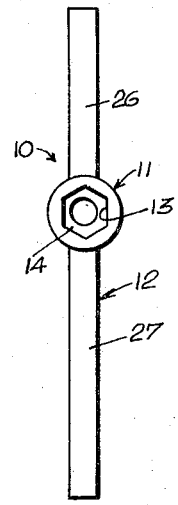
Figure 3:
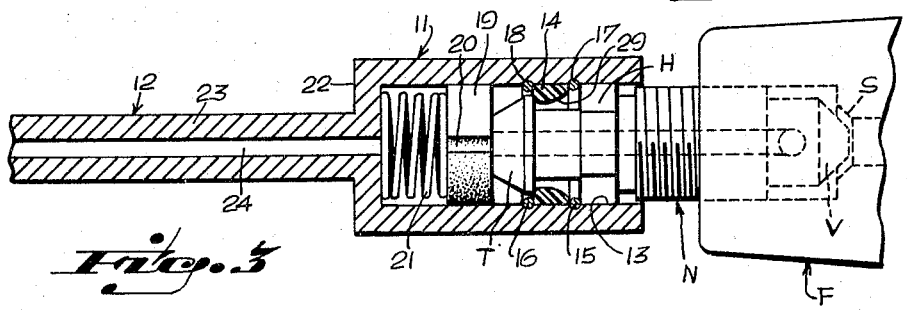
Figure 4:
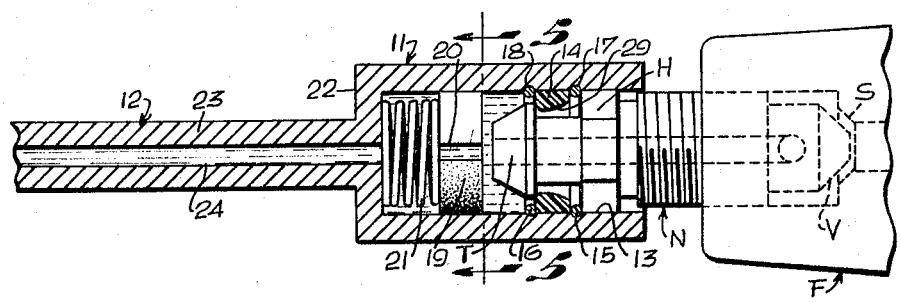
Figure 5:
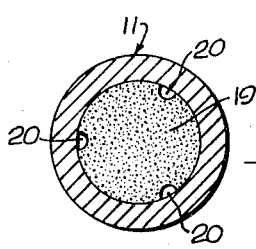

Other objects, features and advantages of the invention will be apparent from the following description when read with reference to the accompanying drawings. In the drawings, wherein like reference numerals denote corresponding parts throughout the several views, FIG. 1 is a side view, partly in section, of a tool for bleeding hydraulic brakes embodying the invention, FIG. 2 is an end view of the tool illustrated in FIG. 1, as seen from the socket end, FIG. 3 is a cross-sectional view on an enlarged scale and with a portion of the handle broken away, showing the tool in one condition of use in connection with a bleeder nipple, FIG. 4 is a cross-sectional view similar to FIG. 3 but showing the tool in another condition of use, and FIG. 5 is a transverse cross-sectional view taken along the line 5—5 of FIG. 4 in the direction of the arrows.

Referring now in detail to the drawings, 10 in FIG. 1 illustrates, generally, a hydraulic brake system bleeding tool, the same comprising a tubular body portion 11 integrally formed with a handle portion 12. The body portion 11, which is preferably of hardened steel, is generally tubular in shape and is formed at its outer end with a hexagonal socket recess 13 of such size as to receive the hexagonal nut portion H of a standard bleeder valve nipple N of a hydraulic fitting F (partially shown in FIGS. 3 and 4). An annular collar 14, of a resilient material such as neoprene, is coaxially secured within the tubular body portion 11 just behind the socket recess 13, being held in place by front and back snap rings 15 and 16 seated in annular recesses 17 and 18, respectively, formed within said tubular body portion. A short, cylindrical piston 19, of a resilient material such as neoprene, is slidably disposed within the tubular body portion 11 behind the collar 14. As best illustrated in FIG. 5, the piston 19 is formed with a plurality of peripheral flutes 20 providing passages for the flow of hydrualic fluid, for the purpose hereinbelow explained. A helical compression spring 21 is disposed within the tubular body portion 11 and constrained between the inner end of the piston 19 and the inner surface of the rear wall portion 22 of said body poriton.

The coaxial extension portion 23 of the handle portion 12 is axially drilled to provide a central passageway 24 communicating at its inner end with interior of the tubular body portion 11. The outer end of the handle extension portion 23 is secured to a cross-bar portion 25 having a short arm 26 extending perpendicularly in one direction, and a relatively long arm 27 extending perpendicularly in the opposite direction. The long arm 27 of the cross bar portion 26 is axially drilled to provide a passageway 28 communicating at its inner end with the central passageway 24 in the extension portion 23 of the handle.

In use, the tool socket recess 13 will be applied over the bleeder valve nipple N of a fitting F to be bled, and pressed down so that the frusto-conical tip T passes through the resilient collar 14, whereupon said collar will resiliently engage and seal off the annular recess between said tip and the nut portion H of said fitting. As illustrated in FIGS. 1, 3 and 4, the interior wall of the annular collar 14 is convexly rounded, as indicated at 29, to permit the applicaiton and withdrawal of the tool over the enlarged tip T of the fitting nipple N. When so applied, as illustrated in FIGS. 3 and 4, the socket recess 13 will be in engagement with the hexagonal nut portion H of the fitting nipple N, so that by gripping and turning the handle portion 12, the valve head V of said nipple can be withdrawn from the valve seat S of the fitting to open the valve. Notwithstanding the opening of the fitting valve as illustrated in FIG. 2, however, hydraulic fluid cannot leak from the fitting because the resilient piston 19 is pressed firmly against the fluid flow opening at the outer end of the nipple tip T. The fitting is now ready for bleeding, which, as described above is accomplished by pressing down slowly upon the brake pedal. The pressure thus introduced into the hydraulic system will unseat the piston 19 against the reactive force of the spring 21, allowing fluid and entrapped air to flow through the piston flutes 20, the back interior end of the tubular body portion 11, and the handle passageways 24 and 28 to be discharged at a position remote from the fitting being bled. As soon as pressure on the brake foot pedal is released, the spring pressed piston 19 will automatically seat against the nipple tip T, in the manner of a check valve, to prevent the entrance of air into the fitting until the fluid pumping operation is completed and the hydraulc fitting valve is screwed back into closed position by use of the tool as a socket wrench.

It is to be noted that by use of the tool, the brake pedal can be depressed by hand and flow of the fluid observed by the same person. Since the tool, as described above, automatically closes the fitting valve when fluid is not being pumped, it is sufficient that observation of the flow be made at a distance to determine when the system has been purged of air at any particular fitting.

It is also to be noted that in the use of the tool, the fact that the fluid discharge passageway 28 is in the relatively long handle arm 27 of the tool permits the mechanic to determine the position of the fluid discharge of a bleeding operation for best observation. A flexible hose can readily be applied to the handle arm 27 to convey the hydraulic fluid pumped to a jar or other container for reuse if desired.

An important advange of the tool resides in the fact that the resilient collar 14, which is the only part subject to any substantial wear after long usage, can readily be removed for replacement by release of the snap ring 15.

While I have illustrated and described herein only one form in which my invention can conveniently be embodied in practice, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. A tool for bleeding automotive hydraulic brakes at the rotary valve wheel cylinder fittings, said fittings being of the type having a screw-threaded valve member with a polygonal nut for operating the valve and a nipple extending from the valve member through which hydraulic fluid is bled when the valve is screwed open, comprising, in combination a tubular body portion adapted at one end to fit over and engage said polygonal nut of said valve member for engagement with the fitting for unitary rotational motion therewith, a handle fixed with respect to said body portion to facilitate turning said body portion for opening and closing the valve fitting, said handle including fluid drainage means communicating with said tubular body portion for the drainage of hydraulic fluid expelled through said nipple when said valve is screwed open, and a check valve in said body portion for sealing off the tip end of an engaged fitting to prevent the drawing in of air when the valve fitting is in open condition, said handle portion having a cross-bar secured to the other end thereof, and said fluid drainage means comprising passageways in said handle portion and said crossbar.

2. A tool for bleeding automotive hydraulic brakes at the rotary valve wheel cylinder fittings, said fittings being of the type having a screw-threaded valve member with a hexagonal nut for operating the valve and a nipple extending from the valve member through which hydraulic fluid is bled when the valve is screwed open, comprising, in combination a tubular body portion having a hexagonal socket portion at one end for engagement with the hexagonal nut of said valve member, an elongated handle portion fixed at one end with respect to the other end of said socket portion to facilitate turning thereof, means in said body portion adapted to sealingly couple the tubular body portion to the nipple of the fitting valve member, passageway means in the tool handle for draining hydraulic fluid from the tubular body portion, and a check valve head in the tubular body portion normally biased against said means in the body and adapted to seal against the nipple when the tubular body portion and nipple are coupled.

3. A tool as defined in claim 1 wherein said cross-bar comprises opposed long and short arm portions, and wherein said passageways comprise an axial opening in said long arm portion.

4. A tool as defined in claim 2 wherein said check valve means comprises a spring-pressed resilient piston slidably arranged in said tubular body portion.

5. A tool as defined in claim 2 wherein said sealing means comprises an annular resilient collar member secured in said tubular body portion.

6. A tool as defined in claim 5 wherein said collar member is secured in said body portion by snap rings for easy replacement.

7. A tool as defined in claim 4 wherein said sealing means comprises an annular resilent collar member secured in said tubular body portion.

References Cited by the Examiner
UNITED STATES PATENTS

| | | | |
|---|---|---|---|
| 2,519,569 | 8/1950 | Hart | 137—614.2 |
| 2,619,914 | 12/1952 | Debkin | 137—614.16 |
| 3,149,817 | 9/1964 | Mullins | 251—346 |
| 3,168,906 | 2/1965 | Brown | 137—614.2 |

WILLIAM F. O'DEA, *Primary Examiner.*

ALAN COHAN, *Examiner.*